United States Patent [19]
Miwa

[11] Patent Number: 5,108,143
[45] Date of Patent: Apr. 28, 1992

[54] SUN VISOR AND PROCESS FOR MANUFACTURING THE SAME

[75] Inventor: Norimichi Miwa, Toyoda, Japan

[73] Assignee: Neo-Ex Lab. Inc., Toyoda, Japan

[21] Appl. No.: 736,620

[22] Filed: Jul. 26, 1991

[30] Foreign Application Priority Data

Jul. 27, 1990 [JP] Japan ................... 2-200142

[51] Int. Cl.[5] .............................................. B60J 3/00
[52] U.S. Cl. ..................................... 296/97.1; 264/23
[58] Field of Search .................... 296/97.1, 97.4, 97.5, 296/97.9, 97.12; 264/23

[56] References Cited

U.S. PATENT DOCUMENTS

| | | | |
|---|---|---|---|
| 4,384,740 | 5/1983 | Marrotta | 296/97.1 |
| 4,477,116 | 10/1984 | Viertel et al. | 296/97.1 |
| 4,763,946 | 8/1988 | Robbins et al. | 296/97.1 |

FOREIGN PATENT DOCUMENTS

| | | |
|---|---|---|
| 39918 | 4/1981 | Japan . |
| 114514 | 5/1989 | Japan . |
| 1215617 | 8/1989 | Japan . |

Primary Examiner—Robert R. Song
Attorney, Agent, or Firm—Dennison, Meserole, Pollack & Scheiner

[57] ABSTRACT

A sun visor includes a pair of symmetrical shells of which the mating surfaces are bonded to each other. Each of the shells comprises a dish-like base member having an annular end surface and a sheet member adhered to the outer surface of the base member. Each of the sheet members has a folded portion which is formed by folding the end portion thereof along the annular end surface of the base member. The outer surface of the folded portion of the sheet member cooperates with the annular end surface of the base member to form the mating surface. The bonding of the mating surfaces is performed by fusion bonding of the annular end surfaces of the base members.

3 Claims, 8 Drawing Sheets

SUN VISOR AND PROCESS FOR MANUFACTURING THE SAME

BACKGROUND OF THE INVENTION

The present invention relates to a sun visor for use with an automobile and process for manufacturing the same.

A conventional sun visor generally comprises a pair of ornamental covering members and a core member. The core member may be a pad which is formed of soft material such as sponge rubber and which is reinforced by a frame member embedded therein or a hollow pad which is formed of hard material such as hard rubber and synthetic resin. The pad is sandwiched in the covering members before the covering members are sewn or welded at the circumferential edges thereof, thereby to form the sun visor in which the core member is wrapped by the covering members.

A problem usually associated with the prior art sun visor is that since the covering members are welded at the circumferential edges thereof, the welded portion is completely exposed, thereby causing undesirable awkward appearance of the sun visor.

Another problem usually associated with the prior art sun visor is that the exposed welded portion of the covering members is easily damaged, thereby causing exposure of the core member.

SUMMARY OF THE INVENTION

It is an object of the invention to provide a sun visor in which the problems associated with the conventional sun visor are eliminated.

It is another object of the invention to provide a sun visor which has substantially no outer sewn or welded portion so that the appearance of the sun visor may be remarkably enhanced.

It is a further object of the invention to provide a sun visor which are tough and durable so that the good appearance may be maintained for a long period of time.

It is a still further object of the invention to provide a manufacturing process suitable for manufacturing a sun visor which may perform the above described objects.

According to the present invention, there is provided a sun visor which comprises a pair of symmetrical shells having a mating surface, respectively. The shells are bonded to each other at the mating surfaces. Each of the shells comprises a dish-like base member formed of synthetic resin and having an annular end surface, and an ornamental sheet member adhered to the outer surface of the base member. Each of the sheet members has a folded portion formed by folding the end portion thereof along the annular end surface of the base member. The outer surface of the folded portion of the sheet member cooperates with the annular end surface of the base member to form the mating surface. The bonding of the mating surfaces is performed by fusion bonding of the annular end surfaces of the base members.

According to the present invention, there is provided a process for manufacturing a sun visor which comprises the steps of providing a female die member and a male die member adapted to form a forming cavity corresponding to the configuration of a first shell therebetween; positioning between the female and male die members a sheet material for forming a sheet member and a resin material for forming a dish-like base member; closing the female and male die members to form the sheet member and the base member. thereby forming the first shell composed of the base member and the sheet member adhered to the outer surface of the base member; folding the end portion of the sheet member along the annular end surface of the base member to form a folded portion extending therealong, thereby forming a first mating surface composed of the annular end surface of the base member and the outer surface of the folded portion of the sheet member; providing a female die member and a male die member adapted to form a forming cavity corresponding to the configuration of a second shell therebetween; positioning between the female and male die members a sheet material for forming a sheet member and a resin material for forming a dish-like base member; closing the female and male die members to form the sheet member and the base member, thereby forming the second shell composed of the base member and the sheet member adhered to the outer surface of the base member; folding the end portion of the sheet member along the annular end surface of the base member to form a folded portion extending therealong, thereby forming a second mating surface composed of the annular end surface of the base member and the outer surface of the folded portion of the sheet member; mating the first mating surface of the first shell and the second mating surface of the second shell; and melting the annular end surfaces of the base members of the first and second shells to bond the first and second mating surfaces.

An important feature of the present invention is that since the end portions of the sheet members inwardly folded along the end surfaces of the base members and the end surfaces of the base members are welded, the welded portions are not exposed, thereby offering the advantage that the sun visor exhibits a good appearance.

Another feature of the present invention is that the welded portion is not exposed, thereby offering the advantage that the durability of the sun visor is remarkably enhanced.

A further feature of the present invention is that the base member and the sheet member is simultaneously formed to form the shell, thereby offering the advantage that the sheet member is sufficiently adhered to the outer surface of the base member. This may also lead to enhancement of the durability of the sun visor.

A still further feature of the present invention is that a pair of shells comprising the base member and the sheet member are previously produced and are subsequently bonded to form the sun visor, thereby offering the advantage that the sun visor is easily manufactured.

The present invention will become more fully apparent from the claims and the description as it proceeds in connection with the drawings.

DETAILED DESCRIPTION OF THE PREFERRED EMBODIMENT

Referring now to FIGS. 1 to 4, shown therein is a sun visor according to the present invention.

As shown in FIGS. 1 to 4, the sun visor 1 is a substantially hollow and plate-like member, and mainly comprises a pair of shells 2A, 2B. Each of these shells 2A, 2B comprises a dish-like base member 4 formed of synthetic resin such as polypropylene and an ornamental sheet member 3 adhered to the outer surface of the base member 4. The shells 2A, 2B have a circumferential mating surface 6, respectively. The mating surfaces 6 are mated with and bonded to each other, thereby to permit formation of the hollow sun visor 1. Further, the sun visor 1 is assembled with a stay 9 which is to be mounted on an automobile body B.

Figure 1:
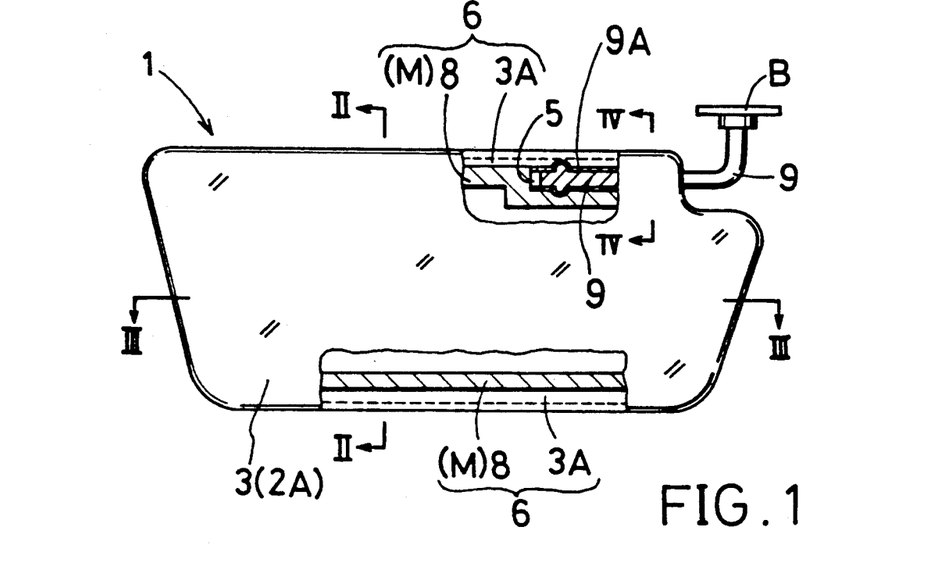
FIG. 1 is an elevational view in section of a sun visor of the present invention.
Figure 2:
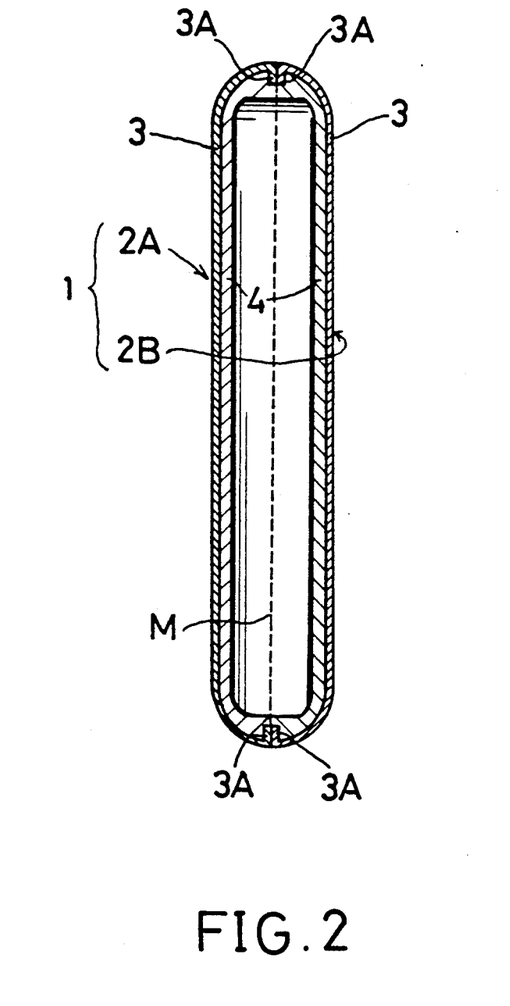
FIG. 2 is an enlarged sectional view taken along lines II—II of FIG. 1.
Figure 3:
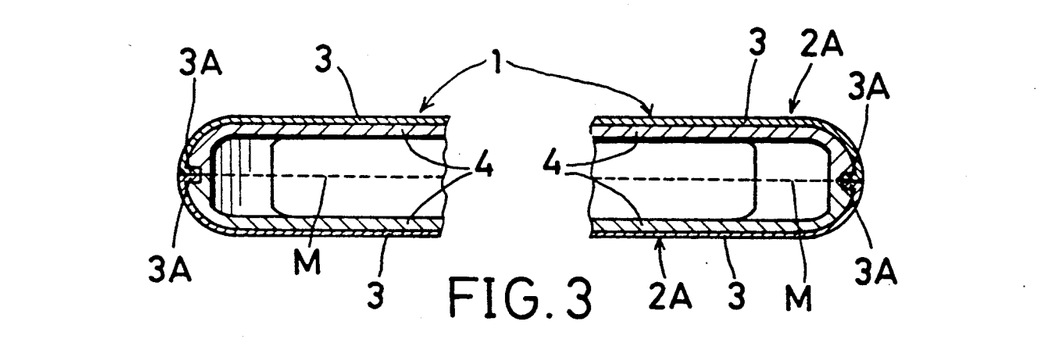
FIG. 3 is an enlarged sectional view taken along lines III—III of FIG. 1.

As shown in FIG. 1, in each of the shells 2A, 2B, the circumferential end portion of the sheet member 3 is inwardly folded to form a folded portion 3A. The folded portion 3A is incorporated into the circumferential end portion of the base member 4 so that the outer surface of the folded portion 3A is substantially coplanar to the circumferential end surface 8 of the base member 4. As will be appreciated, the outer surface of the folded portion 3A of sheet member 3 cooperates with the end surface 8 of the base member 4 to form the mating surface 6.

Figure 4:
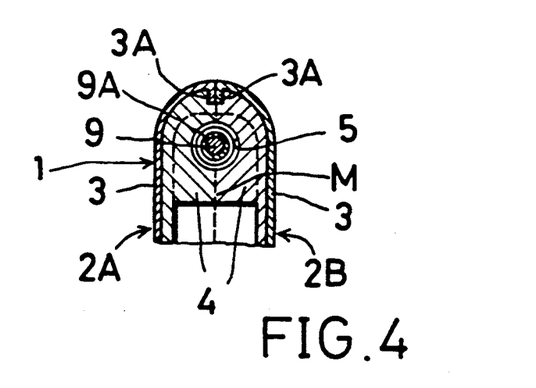
FIG. 4 is an enlarged sectional view taken along lines IV—IV of FIG. 1.

As shown in FIGS. 1 and 4, the base member 4 of each of the shells 2A, 2B has a groove 5. The grooves 5, when the shells 2A, 2B are mated, cooperate to form a cylindrical bore into which a sleeve 9A rotatably fitted to the distal end of the stay 9 can be received.

The shells 2A, 2B are mated with each other, with the sleeve 9A of the stay 9 received in the cylindrical bore formed by the grooves 5. Thereafter, the end surface 8 of the base member 4 is bonded by fusion bonding to form a bonding area M, thereby permitting formation of the sun visor 1.

Referring now to FIGS. 5 to 15, shown therein is apparatus 10 for manufacturing the sun visor 1 according to the present invention.

Figure 5:
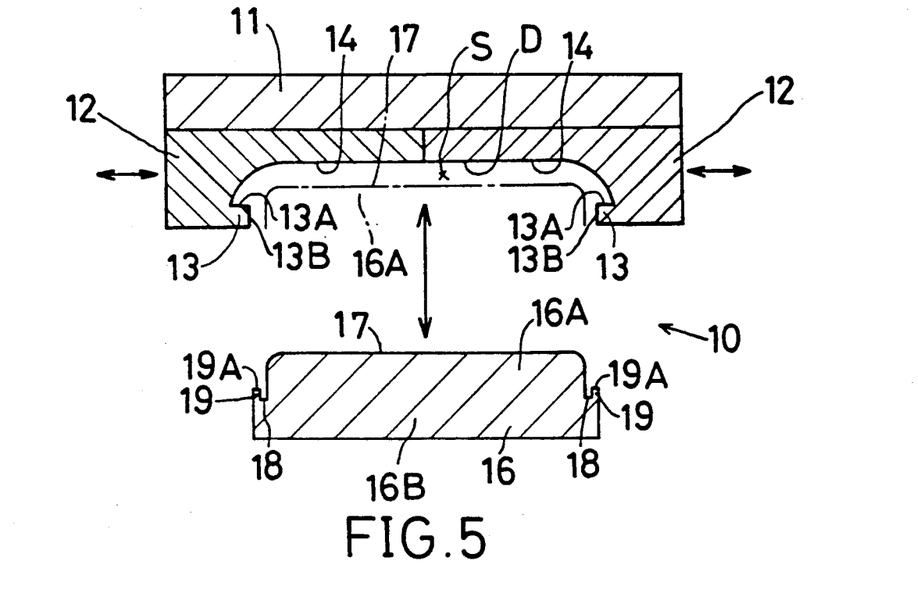
FIG. 5 is a sectional view of a die of the present invention in which a male die member is moved downwardly.
Figure 7:
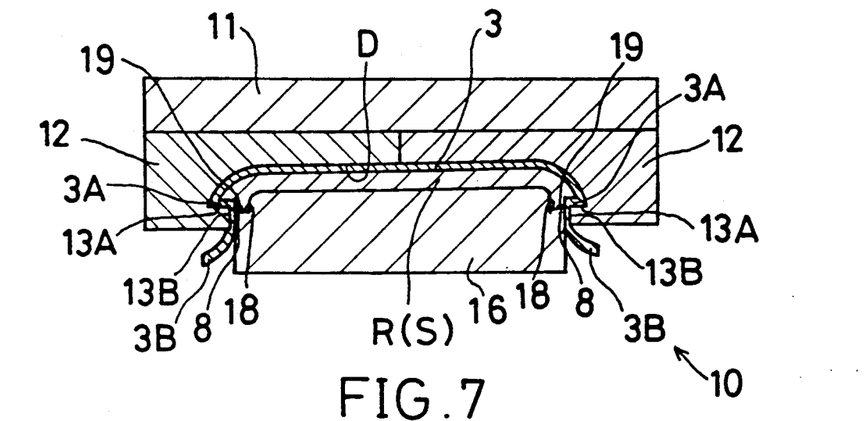
FIG. 7 is a sectional view of the die in which the male die member is engaged with female die members.
Figure 8:
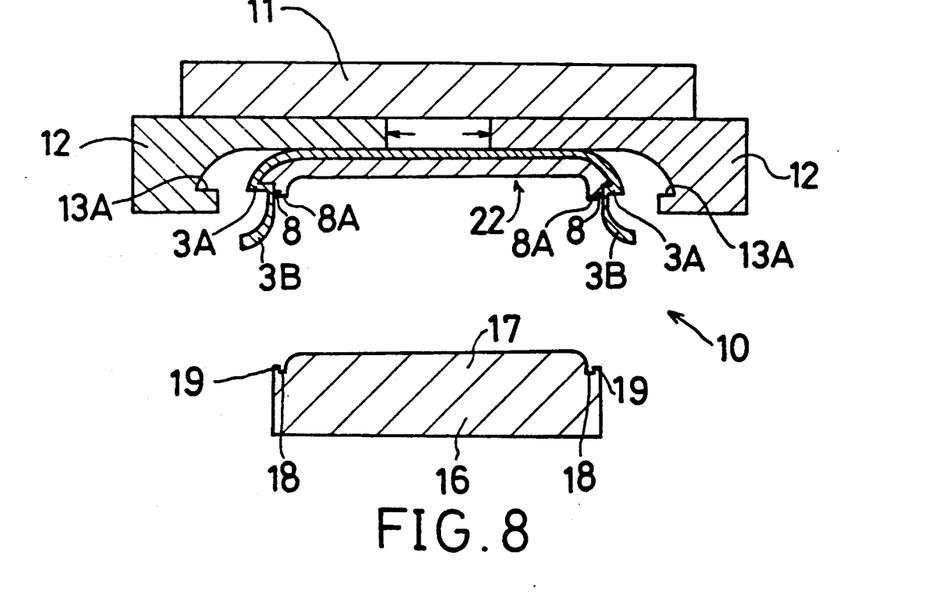
FIG. 8 is a sectional view of the die in which the male die member is downwardly moved and the female die members are moved to a separated position to eject a formed product.

As shown in FIG. 5, the apparatus 10 includes a die for forming the shell 2A. The die mainly comprises a pair of split female die members 12 and a male die member 16 engageable with the female die members 12. The female die members 12 are slidably mounted on a base plate 11 which is horizontally positioned. The female die members 12 are arranged so as to move between a closed position as shown in FIG. 7 and a separated position as shown in FIG. 8. Each female die member 12 has a depressed portion 14 at the lower surface thereof. The depressed portions 14 of the female die members 12, when the female die members 12 are moved to the closed position, aligned with each other to form a forming depression D. The forming depression D, when the female die members 12 are engaged with the male die member 16, cooperates with an outer surface 17 of an upper die portion 16A of the male die member 16 to form a forming cavity S in which the shell 2A is to be formed. Each female die member 12 also has a flange 13 which is inwardly and horizontally projected and has an inner horizontal surface 13A and a vertical surface 13B. The flanges 13 of the female die members 12, when the female die members 12 are moved to the closed position, aligned with each other to form an annular flange.

As shown in FIG. 5, the male die member 16 is arranged under the female die members 12. The male die member 16 also has a increased lower die portion 16B integrally connected to the upper die portion 16A, thereby to form an annular shoulder portion therebetween. The annular shoulder portion has an annular projection 19 formed therealong. The annular projection 19 has a planer upper surface 19A and forms an annular groove 18 extending along the upper die portion 16A.

As will be easily understood, the outer surface 17 of the upper die portion 16A is partly machined to form a forming portion (not shown) by which the groove 5 may be effectively formed on the base member 4 when the formation of the shell 2A is completed.

As shown in FIG. 7, the upper die portion 16A of the male die member 16 is inserted into the forming depression D of the female die members 12 so that the upper surface 19A of the annular projection 19 is coplanar to the horizontal surfaces 13A of the flanges 13, thereby permitting formation of the forming cavity S which is configured to the configuration of the shell 2A. Also, as will be appreciated, the lower die portion 16B has a diameter which may produce a clearance between the side surface of the lower die portion 16B and the vertical surfaces 13B of the flanges 13.

The sun visor 1 is manufactured by the above-described apparatus 10.

Figure 6:
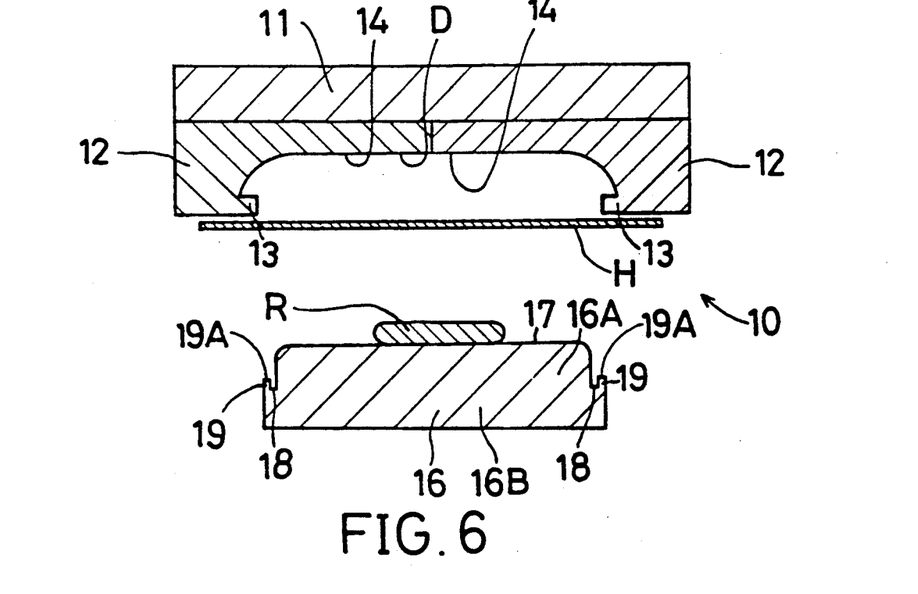
FIG. 6 is a view similar to FIG. 5, in which a sheet material for forming a sheet member and molten resin for forming a base member have been supplied.
Figure 17:
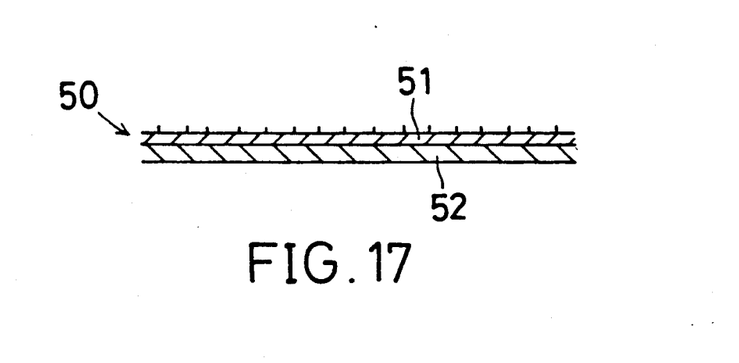
FIGS. 17 and 18 are sectional views of sheet materials which are usable in the present invention.
Figure 18:
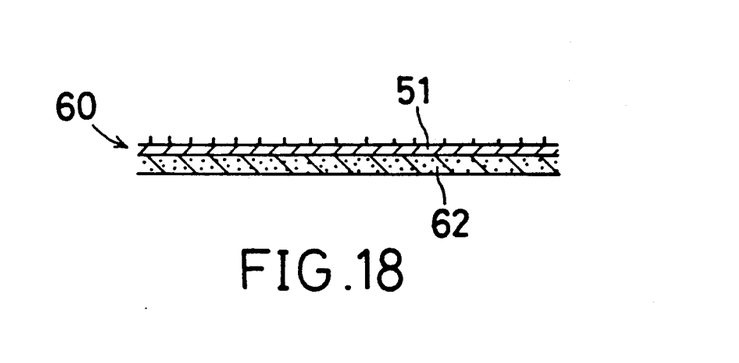

In a typical operation to form the sun visor 1, as shown in FIG. 6, the female die members 12 are moved to the closed position and the male die member 16 is lowered before a sheet material H for forming the sheet member 3 is arranged under the forming depression D of the female die members 12 so that the outer surface thereof faces to the forming depression D. At the same time, a desired amount of molten resin R such as polypropyrene for forming the base member 4 is supplied on the outer surface 17 of the male die member 16. Some different types of laminated sheets, for example, sheets 50, 60 as shown in FIGS. 17 and 18, may be used as the sheet material H in the present invention. The sheet 50, as shown in FIG. 17, comprises a fabric sheet 51 and a soft resin sheet 52 which is bonded to the rear surface of the fabric sheet 51. The sheet 60, as shown in FIG. 18, comprises a fabric sheet 61 and a cushioning sheet 62 formed of polyurethane or the like which is bonded to the rear surface of the fabric sheet 61. Such sheets 50, 60 have strong adhesion to the base member 4. Further, the sheet material H may be previously partly formed to conform to the configuration of the forming depression D of the female die members 12 and may subsequently be arranged therein.

Subsequently, as shown in FIG. 7, the male die member 16 is upwardly moved until the upper surface 19A of the annular projection 19 becomes coplanar to the inner horizontal surfaces 13A of the flanges 13 for defining the forming cavity S. Then, the sheet material H is effectively formed along the surface of the forming depression D to form the sheet member 3 as well as the molten resin R is molded to form the base member 4. As shown in FIG. 7, the end portion of the sheet material H is effectively folded by the horizontal surfaces 13A of the flanges 13 of the female die members 12 to form the folded portion 3A. Further, the edge portion 38 joined to the folded portion 3A of the sheet member 3 is sandwiched between the vertical surfaces 13B of the flanges 13 of the female die members 12 and the outer surface of the lower die portion 16B of the male die member 16, thereby preventing leakage of the molten resin R. As shown in FIG. 7, the upper surface 19A of the annular projection 19 forms the end surface 8 on the molded base member 4. Since the horizontal surfaces 13A of the flanges 13 are coplanar to the upper surface 19A of the projection 19, the end surface 8 of the base member 4 is coplanar to the outer surface of the folded portion 3A of the sheet member 3 as best shown in FIG. 8. Also, since the male die member 16 has the annular groove 18, an annular projected portion 8A is formed on the end surface 8 of the base member 4. Further, since the forming portion for the groove 5 is formed on the outer surface 17 of the upper die portion 16A as described above, the groove 5 is formed on the base member 4.

Figure 9:
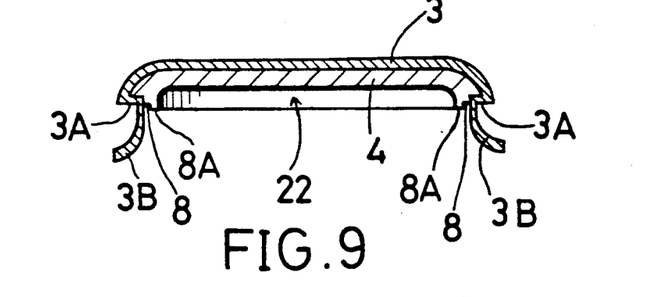
FIG. 9 is a sectional view of the product.
Figure 10:
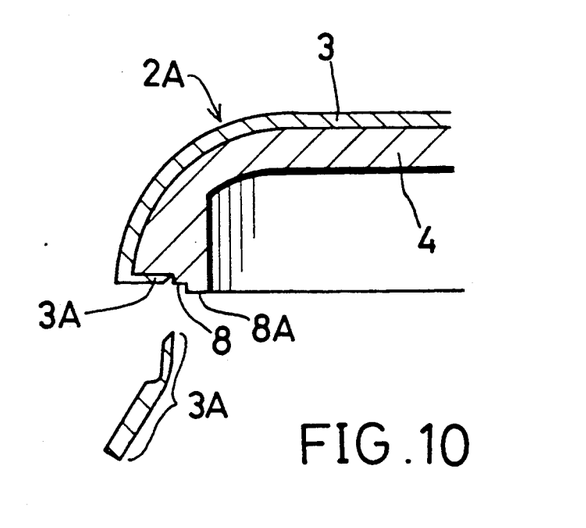
FIG. 10 is a partial sectional view of the product in which the edge portion of the sheet member is cut out to finally form a shell.

Thereafter, as shown in FIG. 8, the male die member 16 is lowered and the female die members 12 are moved to the separated position to eject a product 22. As shown in FIG. 9, the sheet member 3 in the product 22 has the edge portion 3B which is to be discarded. Therefore, the edge portion 3B is cut out to finally form the shell 2A as shown in FIG. 10. In the shell 2A as formed, the base member 4 is molded with the molten resin, thereby permitting firm adhesion between the sheet member 3 and the base member 4.

The shell 2B is formed in the same manner as the forming procedure of the shell 2A. Therefore, the explanation of the forming procedure of the shell 2B will be omitted.

Figure 11:
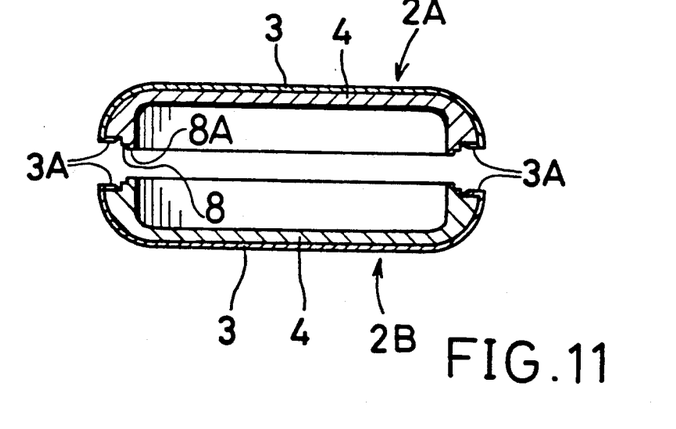
FIG. 11 is a sectional view of a pair of shells positioned opposite to each other.
Figure 12:
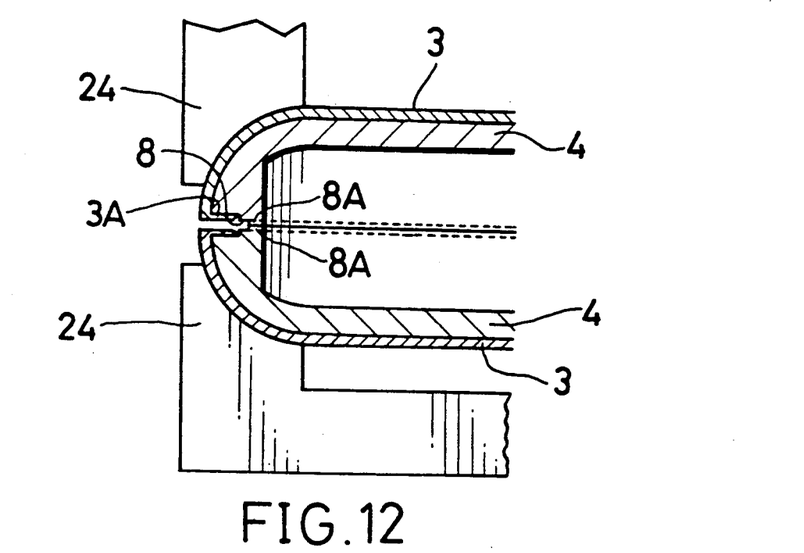
FIG. 12 is a partial sectional view of the shells which are mated and are connected to electrodes of a bonding machine.
Figure 13:
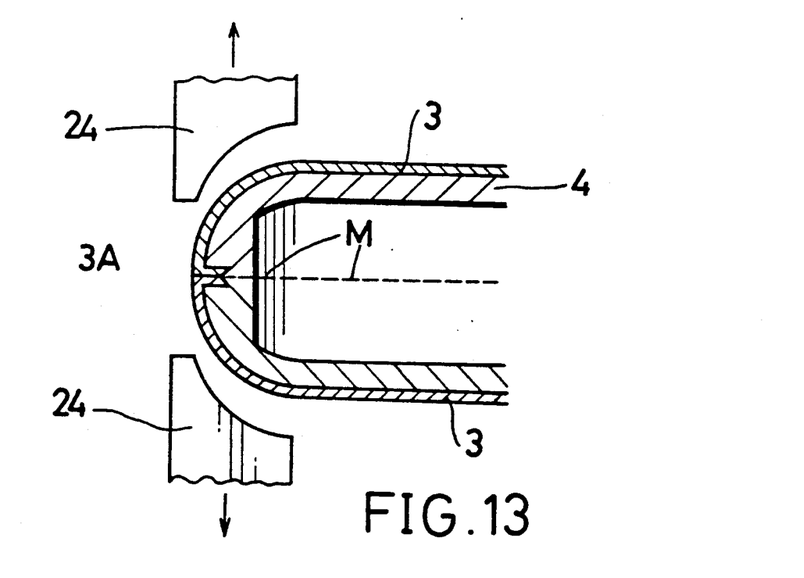
FIG. 13 is a partial sectional view of the shells after completion of welding.

As shown in FIG. 11, the shells 2A, 2B as formed are arranged opposite to each other, with the sleeve 9A (not shown) of the stay 9 is received between the grooves 5 (not shown). Thereafter, as shown in FIG. 12, the shells 2A, 2B are mated with each other so that the upper surfaces of the annular projected portions 8A of the base members 4 contact with each other. Subsequent to the mating of the shells 2A, 2B, as shown in FIG. 12, the shells 2A, 2B are connected to electrodes 24 of an ultrasonic bonding machine (not shown), respectively. The ultrasonic bonding machine is operated to apply an ultrasonic wave on the shell 2A, 2B, thereby melting the projected portions 8A to form the bonding area M as shown in FIG. 13. Then, the end surfaces 8 of the base member 4 are effectively bonded to each other and the folded portions 3A of the sheet member 3 contact with each other. After completion of the welding procedure, the electrodes 24 of the bonding machine are removed from the shells 2A, 2B to finally obtain the sun visor 1. As will be easily recognized, the sun visor 1 has no welded portion on its outside surface, thereby preventing undesirable awkward appearance thereof.

Figure 14:
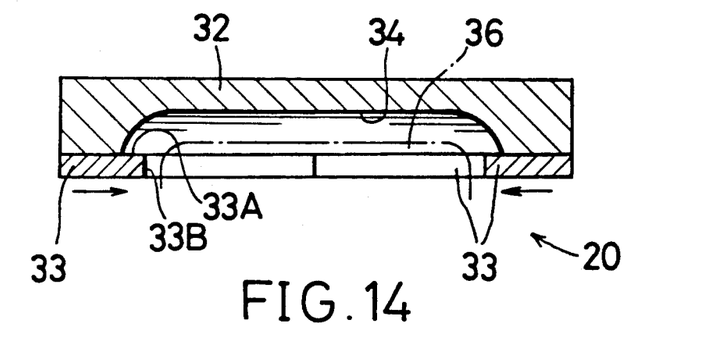
FIG. 14 is a sectional view of a die in a first modified form.
Figure 15:
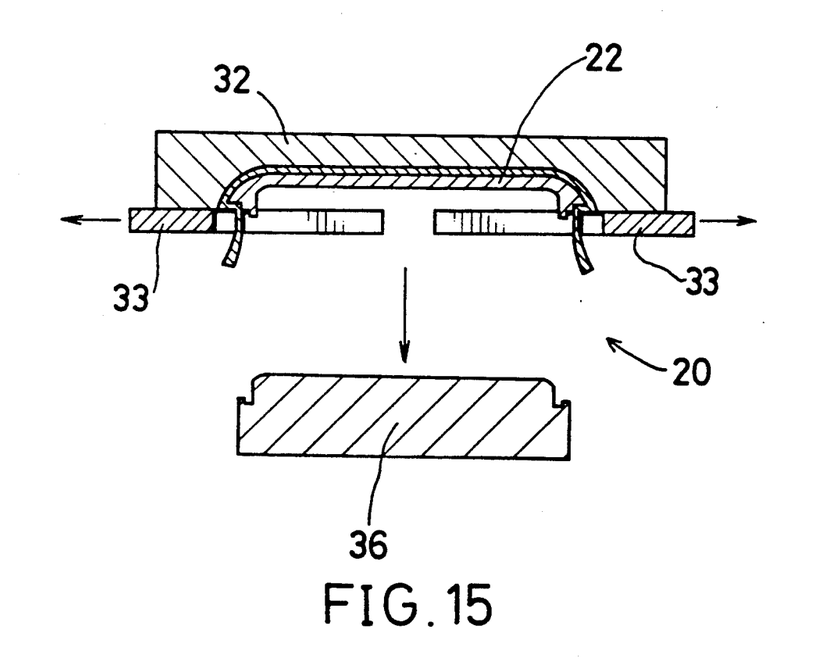
FIG. 15 is a sectional view of the die which is opened to eject a formed product.

Referring now to FIGS. 14 and 15, shown therein is apparatus 20 for manufacturing the sun visor 1 in a modified form.

As shown in FIG. 14, the apparatus 20 includes a die for forming the shell 2A. The die mainly comprises a female die member 32 and a male die member 36 engageable with the female die member 32. The female die member 32 has a depressed portion 34 at the lower surface thereof and has a pair of slidable plates 33 mounted horizontally on the lower surface thereof. The slidable plates 33 can be moved between a closed position as shown in FIG. 14 and a separated position as shown in FIG. 15. Also, each of the slidable plates 33 has a horizontal surface 33A and a vertical surface 33B and functions the same way as the flange 13 in FIG. 5. The male die member 36 is constructed in the same manner as the male die member 16 in FIG. 5.

The modified apparatus 20 is operated substantially in the same manner as the apparatus 10 in FIG. 5 except that the slidable plates 33 are moved to the separated position as shown in FIG. 15 to eject the product 22. Therefore, the explanation of the operation of the apparatus 20 will be omitted.

Figure 16:
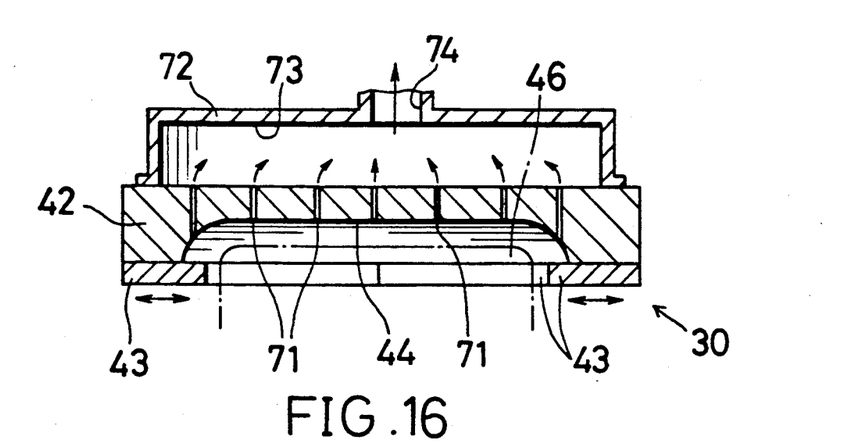
FIG. 16 is a sectional view of a die in a second modified form.

Referring now to FIG. 16, shown therein is apparatus 30 for manufacturing the sun visor 1 in a further modified form.

As shown in FIG. 16, the apparatus 30 includes a die for forming the shell 2A. The die mainly comprises a female die member 42 and a male die member 46 engageable with the female die member 42. The female die member 42 has a depressed portion 44 at the lower surface thereof and has a pair of slidable plates 43 which is constructed in the same way as the slidable plates 33 in FIG. 14. The female die member 42 has a plurality of through holes 71 communicating the upper surface thereof with the depressed portion 44. The female die member 42 has a housing 72 which is mounted on the upper surface of the female die member 42. The housing 72 has a chamber 73 communicating with all the through holes 71 and has an outlet port 74 which is to be coupled to a vacuum source (not shown).

The modified apparatus 30 is operated substantially in the same manner as the apparatus 20 in FIG. 14 except that the vacuum source is operated to apply suction force on the sheet material for forming the same before the male die member 46 is upwardly moved to finally form the shell. Therefore, the explanation of the operation of the apparatus 30 will be omitted.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A sun visor having a pair of symmetrical shells having a mating surface, respectively, said shells being bonded to each other at said mating surfaces, each of said shells comprising:
   a dish-like base member formed of synthetic resin and having an annular end surface; and
   an ornamental sheet member adhered to the outer surface of said base member,
   each of said sheet members having a folded portion formed by folding the end portion thereof along said annular end surface of said base member, the outer surface of said folded portion of said sheet member cooperating with said annular end surface of said base member to form said mating surface, the bonding of said mating surfaces being performed by fusion bonding of said annular end surfaces of said base members.

2. The sun visor as defined in claim 1, wherein said outer surface of said folded portion of said sheet member is coplanar to the end surface of said base member.

3. The sun visor as defined in claim 2, wherein said annular end surface of said base member has a projected portion extending therealong, said projected portions being melted to permit sufficient fusion bonding of said annular end surfaces of said base members.

* * * * *